UNITED STATES PATENT OFFICE.

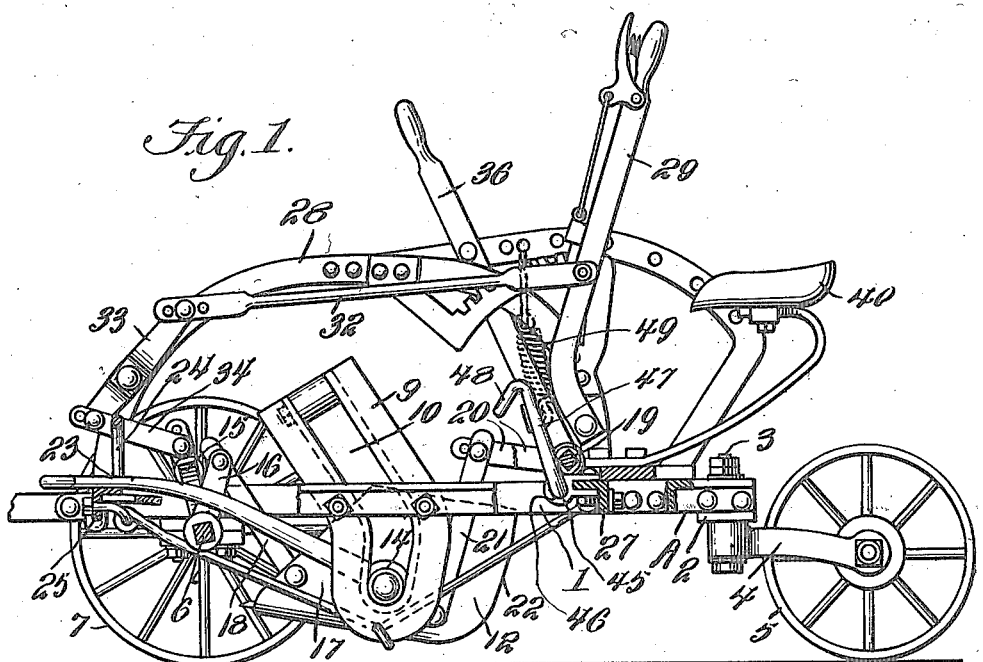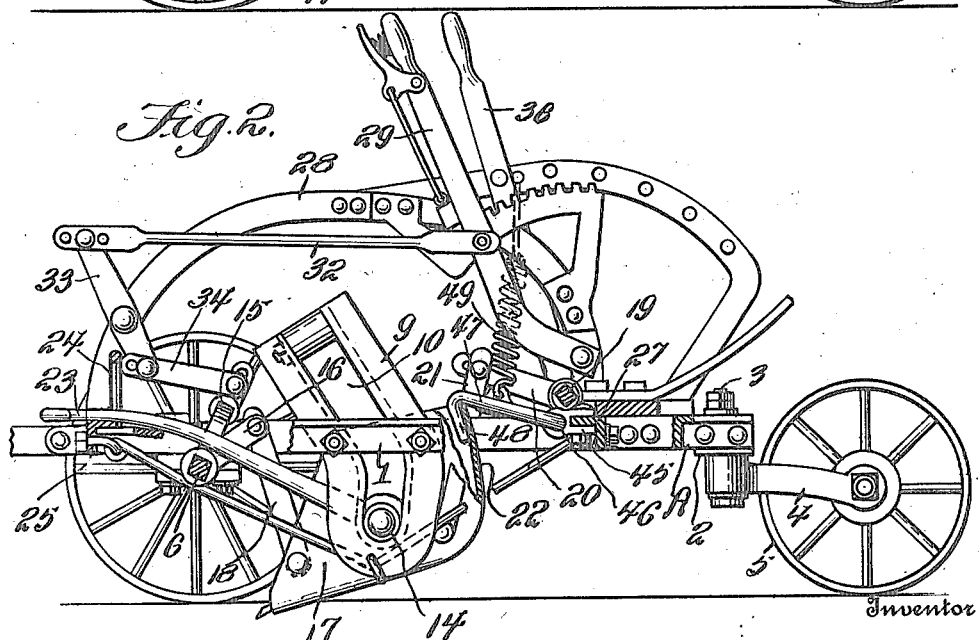

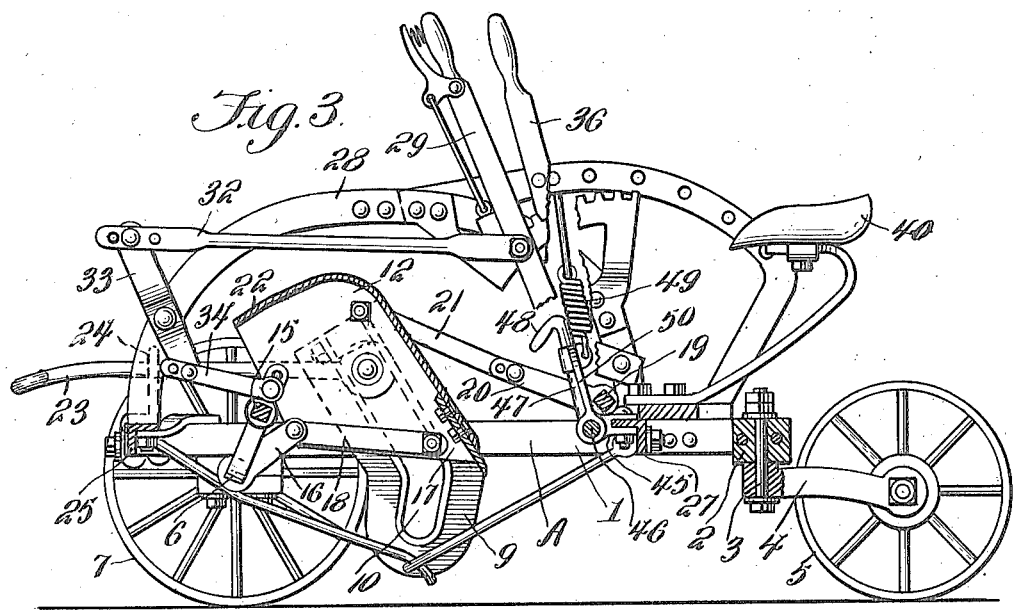
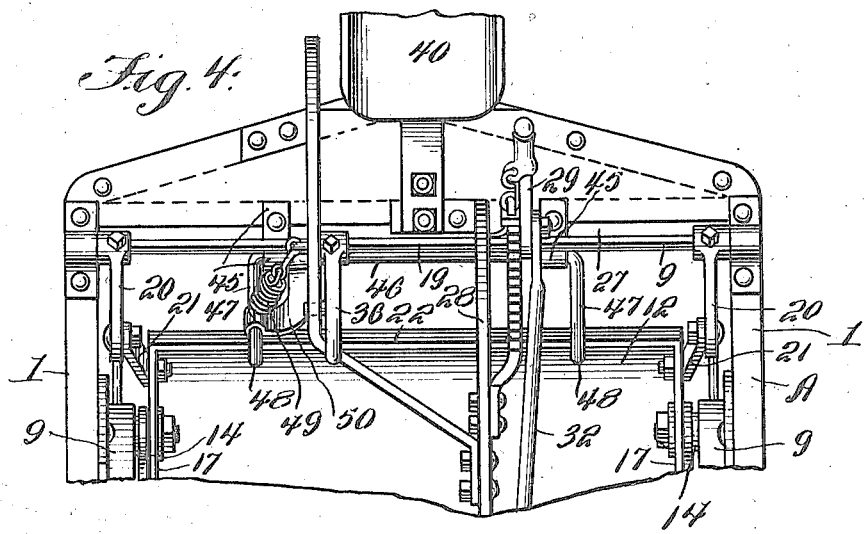

THOMAS B. FERGUSON, OF HANFORD, CALIFORNIA.

SCRAPER.

1,213,767.

Specification of Letters Patent.

Patented Jan. 23, 1917.

Application filed April 8, 1913. Serial No. 759,723.

*To all whom it may concern:*

Be it known that I, THOMAS B. FERGUSON, a citizen of the United States, residing at Hanford, in the county of Kings and State of California, have invented new and useful Improvements in Scrapers, of which the following is a specification.

This invention relates to scrapers for excavating and removing dirt, and it has particular reference to scrapers of the type described and claimed in Letters Patent of the United States No. 1,074,589, granted to me on the 30th day of September, 1913.

A scraper of the type above referred to includes a frame structure supported at its forward end on an axle having transporting wheels and at its rear end on a trailer wheel, said frame serving to support a scoop or scraper and means whereby the latter may be tilted and moved to various engaging and non-engaging positions with respect to the ground, the tilting and moving means including a sleeve supported for rotation on the front axle and having radial arms or cranks.

One object of the present invention is to dispense with the sleeve and to substitute for the straight axle an arched axle, thereby simplifying the construction, and also preventing the front axle from obstructing material entering the scoop or scraper.

A further object of the invention is to provide simple and effective retaining members in the nature of hooks, normally engaging the top edge of the back wall of the scoop and retarding or preventing its tilting to a discharging position, means being provided for quickly disengaging the retarding members by pressure of the foot of the operator.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a longitudinal vertical sectional view of a wheeled scraper constructed in accordance with the invention, and showing the scoop in position for transportation. Fig. 2 is a similar view showing the scoop arranged for digging or scraping. Fig. 3 is a similar view showing the scoop released from the retarding hooks and tilted. Fig. 4 is a detail plan view of the rear portion of the machine.

Corresponding parts in the several figures are denoted by like characters of reference.

The frame A of the machine includes side members 1 that converge rearwardly and support between them a box or bearing member 2 for a vertical shaft 3 carrying a yoke 4 which supports a caster wheel or trailer 5. The forward part of the frame is supported on an axle 6 having wheels 7.

Mounted on the parallel forward portions of the side members of the frame, in rear of the axle, are guides 9 of angular shape having slots 10 wherein are guided the trunnions 14 of the scoop 12. The axle 6 is provided intermediate the transporting wheels with an arch 15, and said axle is provided adjacent to the arched portion with radially extending arms 16 which are connected with the sides 17 of the scoop by means of links 18, said links being pivotally connected with the side members 17 near the forward edge of the scoop. Supported on the frame in rear of the scoop is a rock shaft 19 having radially extending arms 20 which are connected with the sides 17 of the scoop by means of links 21, said links being pivotally connected with the sides 17 in rear of the trunnions 14 and relatively near the upturned rear wall 22 of the scoop. Pivotally connected with the trunnions 14 are draft rods 23 which are extended forwardly and guided through keepers 24 on the front cross bar 25 of the frame.

The frame A includes a cross bar 27 which is connected with the front cross bar 25 by an arch 28 longitudinally spanning the frame. Fulcrumed on said arch near the rear end thereof is the tilting lever 29 which is connected by a rod 32 with one arm of a lever 33 fulcrumed on the forward part of the arch and the other arm of which is connected by a link 34 with the arched portion 15 of the axle which constitutes a crank whereby the axle may be rocked or tilted to effect adjustment of the scoop through the medium of the arms 16 and links 18. Connected directly with the rock shaft 19 is a lever 36 known as the unloading lever, and whereby the shaft may be rocked or oscillated, means being provided whereby the lever may be retained at various adjustments. A seat 40 is provided for the driver or operator.

The cross bar 27 which is located in rear of the scoop, is provided with forwardly extending bracket members 45 affording bearings for a rock shaft 46 having forwardly extending arms 47 provided with terminal hooks 48 that are adapted to engage the upper edge of the upturned rear wall 22 of the scoop, thereby holding the scoop securely against tilting prematurely to a discharging position. Springs 49 are provided, the tension of which is exerted to normally disengage the hooks 48 from the rear wall of the scoop, and the rock shaft 46 has a foot piece or treadle 50 whereby it may be rocked by the foot of the operator against the tension of the springs 49 to place the hooks 48 in engaging position with respect to the rear wall of the scoop.

In Fig. 1 of the drawings the scoop 12 is shown in its normal position for transportation. By manipulating the tilting lever 29 and changing the position thereof to that seen in Fig. 2, the scoop will be tilted, through the medium of the arched axle and the intermediate link connections, until the forward edge thereof engages the ground and cuts into the ground to the required depth, see Fig. 2. At the same time, the operator by means of the treadle 50 may rock the shaft 46 against the tension of the springs 49 to place the hooks 48 in engagement with the upper edge of the rear wall of the scoop, thereby preventing excessive or premature tilting of the latter to a discharging position. The operator may maintain the parts in this position by keeping his foot on the treadle, although the strain on the scoop will usually maintain the hooks in engagement with the rear wall thereof frictionally while the work is in progress. When a load has been accumulated, the tilting lever 29 is again brought into play to restore the scoop to the carrying position shown in Fig. 1. When the load is to be discharged, the operator releases the foot pressure on the treadle 50, causing the hooks 48 to become disengaged from the scoop; the latter is then tilted by the tilting lever until the front edge catches the ground, after which the tilting operation is completed by proper manipulation of the unloading lever 36.

It will be seen that the arched axle is utilized as one of the scoop tilting and adjusting devices, the arched portion constituting a crank which is connected with the operating lever by intermediate connecting means. The sleeve used in my previous construction and which for various reasons has been found objectionable is thus dispensed with, and an additional advantage is gained by arching the axle, and thereby preventing said axle from obstructing material about to enter into the scoop. The retarding hooks 48 will positively obstruct the tilting of the scoop while in load carrying or in excavating position, but when the scoop is to be tilted for the purpose of discharging the load the tension of the springs 49, exerted following the release of the pressure of the foot of the operator on the foot piece or treadle 50 will immediately disengage said hooks and release the scoop and permit the latter to be tilted.

Having thus described the invention, what is claimed as new, is:—

1. In a machine of the class described, a main frame, an axle supporting the forward portion of the frame, ground wheels on the axle, an arch on the axle intermediate the ground wheels, fixed arms secured on the axle intermediate the arch and the ground wheels, a trailer wheel supporting the rearward portion of the frame, a rock shaft mounted on the frame and having radial arms, a scoop, links connecting the forward and rearward portions of the scoop with the fixed arms extending from the axle and the rock shaft, respectively, means connected to the axle arch for rocking the axle, and means for rocking the rock shaft independently of the axle, also to effect adjustment of the scoop.

2. In a machine of the class described, a carrying frame, two shafts independently supported for rocking movement, one of said shafts constituting also an axle on which supporting wheels are mounted, fixed radial arms extending from the shafts, a scoop, links connecting the scoop with the radial arms, means for rocking the shafts to effect adjustment of the scoop, guiding means for the scoop, a third shaft supported for rocking movement and having scoop engaging hooks, a spring to withdraw the hooks from engagement with the scoop, and a treadle to actuate the rock shaft against the tension of the spring.

In testimony whereof I affix my signature in presence of two witnesses.

THOMAS B. FERGUSON.

Witnesses:
R. L. Pfeil,
W. F. Kelley.